(No Model.)  J. H. MORIARTY.  14 Sheets—Sheet 1.
ADJUSTABLE GARMENT PATTERN.

No. 432,322.  Patented July 15, 1890.

Witnesses  Inventor
F. W. Cornwall  John H. Moriarty
Cha' F Mallard  By his Attorneys
L. S. Bacon (No Model.) 14 Sheets—Sheet 2.
J. H. MORIARTY.
ADJUSTABLE GARMENT PATTERN.

No. 432,322. Patented July 15, 1890.

Fig. 3.

(No Model.) 14 Sheets—Sheet 3.
J. H. MORIARTY.
ADJUSTABLE GARMENT PATTERN.

No. 432,322. Patented July 15, 1890.

Witnesses
F. W. Cornwall
Chas. F. Mallard

Inventor
John H. Moriarty
By his Attorneys
L. S. Bacon (No Model.) 14 Sheets—Sheet 4.
J. H. MORIARTY.
ADJUSTABLE GARMENT PATTERN.
No. 432,322. Patented July 15, 1890.

Fig. 6

(No Model.) 14 Sheets—Sheet 5.
J. H. MORIARTY.
ADJUSTABLE GARMENT PATTERN.

No. 432,322. Patented July 15, 1890.

Fig. 7

Witnesses
F. W. Conwall
Chas. F. Mallard

Inventor
John H. Moriarty
L. S. Bacon
Attorney

Fig. 8

(No Model.) 14 Sheets—Sheet 8.

J. H. MORIARTY.
ADJUSTABLE GARMENT PATTERN.

No. 432,322. Patented July 15, 1890.

Fig. 10.

(No Model.) 14 Sheets—Sheet 9.
J. H. MORIARTY.
ADJUSTABLE GARMENT PATTERN.

No. 432,322. Patented July 15, 1890.

Fig. 11

Witnesses
F. W. Cornwall
Chas F. Mallard

Inventor
John H. Moriarty
By his Attorneys
L. S. Bacon (No Model.) 14 Sheets—Sheet 11.

J. H. MORIARTY.
ADJUSTABLE GARMENT PATTERN.

No. 432,322. Patented July 15, 1890.

Witnesses: F. W. Cornwall, Cha' F. Mallard

Inventor: John H. Moriarty
By his Attorneys L. S. Bacon (No Model.) 14 Sheets—Sheet 12.
J. H. MORIARTY.
ADJUSTABLE GARMENT PATTERN.

No. 432,322. Patented July 15, 1890.

Fig. 15

Witnesses
Inventor
John H. Moriarty
By his Attorneys
L. S. Bacon (No Model.) 14 Sheets—Sheet 13.

J. H. MORIARTY.
ADJUSTABLE GARMENT PATTERN.

No. 432,322. Patented July 15, 1890.

Witnesses
F. R. Cornwall
Chas. F. Mallard

Inventor
John H. Moriarty
By his Attorneys
L. S. Bacon

Fig. 18.

UNITED STATES PATENT OFFICE.

JOHN H. MORIARTY, OF WASHINGTON, DISTRICT OF COLUMBIA.

ADJUSTABLE GARMENT-PATTERN.

SPECIFICATION forming part of Letters Patent No. 432,322, dated July 15, 1890.

Application filed February 14, 1890. Serial No. 340,486. (No model.)

*To all whom it may concern:*

Be it known that I, JOHN H. MORIARTY, a citizen of the United States, residing at Washington, in the District of Columbia, have invented certain new and useful Improvements in Adjustable Patterns; and I do hereby declare the following to be a full, clear, and exact description of the invention, such as will enable others skilled in the art to which it appertains to make and use the same.

My invention relates to an improvement in proportionate or uniform adjustable patterns for garments; and it consists in the construction of parts hereinafter described, and definitely pointed out in the claims.

The object of my invention is to provide patterns for garments which will retain their uniform proportions, and when a part is adjusted to correspond with the measures the movement of one part moving or adjusting the other parts, thereby retaining uniformity throughout the pattern. I attain this object by the construction illustrated in the accompanying drawings, forming a part of this specification, wherein like letters and figures of reference indicate corresponding parts in the several views, and in which—

Figure 1:
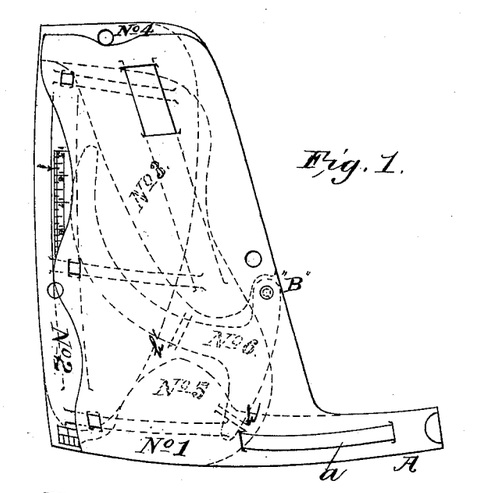
Figure 1 represents a pattern for dress-coat skirts.
Figure 2:
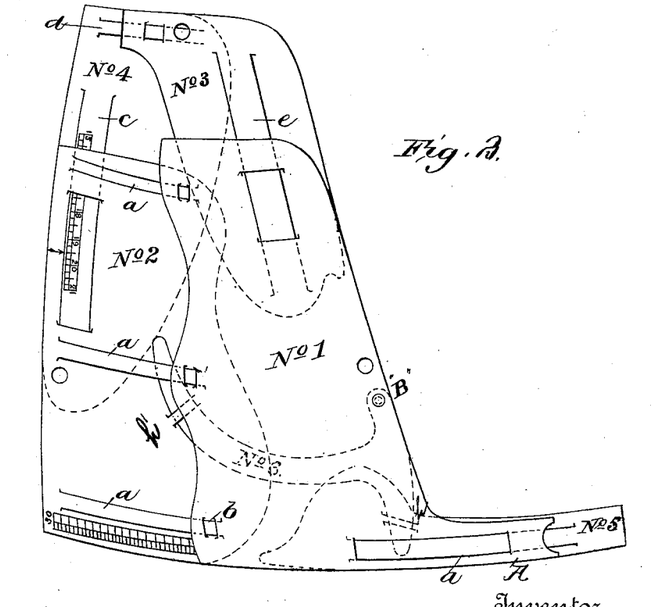
Fig. 2 is a similar view with the parts extended.
Figure 3:
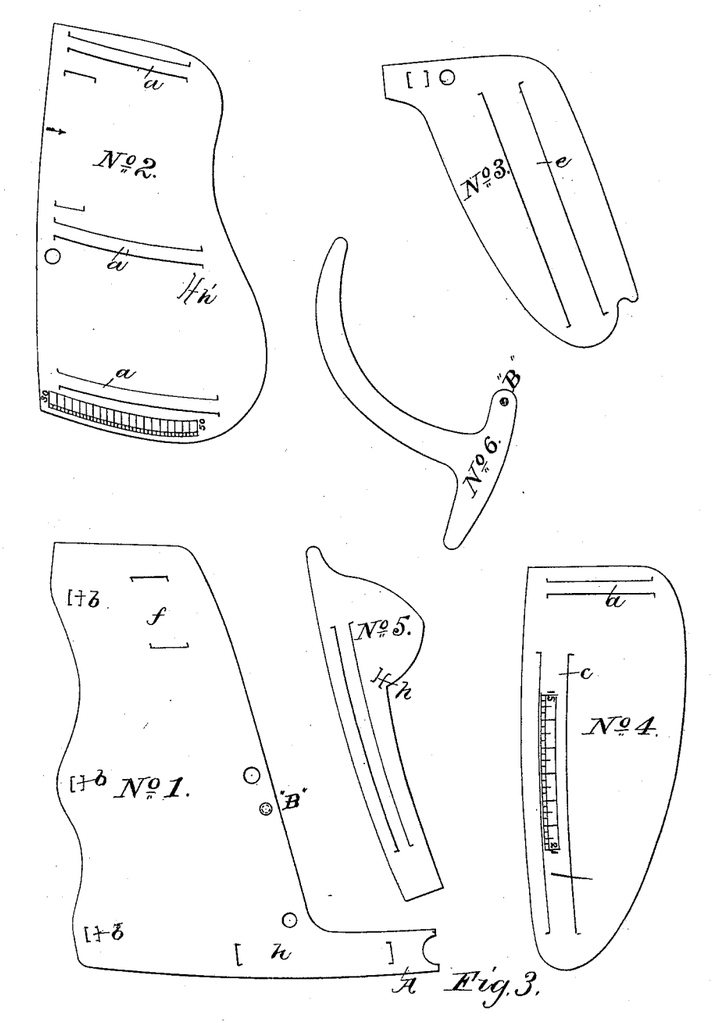
Fig. 3 represents detail views of the several parts of Fig. 1.

In Figs. 1, 2, and 3 of the drawings, 1 represents the body-piece of the pattern, having the lower outer extension A. 2 represents the edge extension-piece, and 3 and 4 the upper extensions. The edge piece 2 is united to the body-piece 1 by having a series of guide-strips *a*, formed by making two parallel cuts in the material, which pass through guide-loops *b* in the body-piece 1. These strips are placed at the center and at each side of the edge piece 2. The piece 4 has a guide-strip *c* near its outer edge, which passes through loops in the piece 2, and it also has a guide-strip *d* passing through a loop in the upper end of the piece 3. The piece 3 has a guide-strip *e* made therein near its center, which passes through a loop *f* in the body-piece 1. The several members of the pattern are thus all interlocked and adjustably held together. At the lower end of the body-piece is a sliding extension 5, interlocked with the part A. This extension 5 has a loop *h* formed thereon, which has the lower end of a curved arm or lever 6 therein. This lever has an upper and lower extension at one end, the former being pivoted at B to the body-piece 1 and the latter passing through the loop in the part 5 below the pivotal portion. The inner portion of the curved arm 6 is made long and curved gradually upward, its outer end passing through a loop *h'* made in the edge piece 2. When the edge piece 2 is drawn out, the curvature of the arm 6 tends to force it downward, and the lower extension thereof is carried forward in an arc of a circle, thereby projecting the extension 5 out, the degree of its movement being governed by the movement of the edge piece 2. In contracting the parts the reverse movement of the lever draws the extension in, as is obvious. At the lower edge of the piece 2 and at the outer edge of the piece 4, I place scales to indicate the desired point corresponding to the measure.

Figure 4:
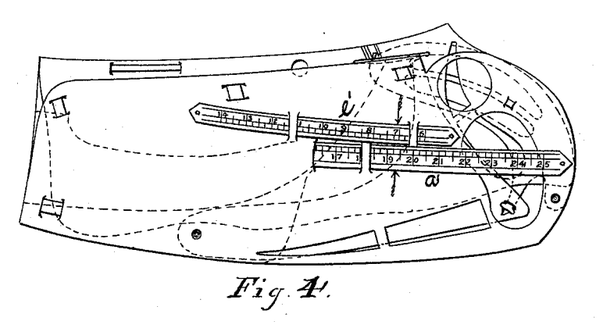
Figs. 4, 5, and 6 represent, respectively, the sleeve-pattern contracted, extended, and in detail.
Figure 5:
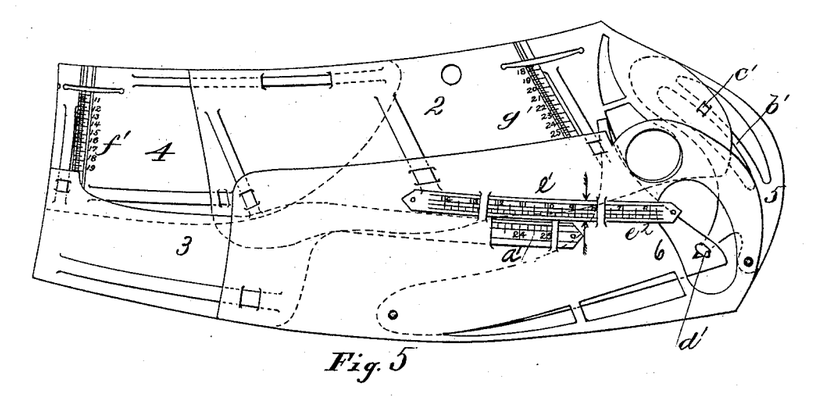
Figure 6:
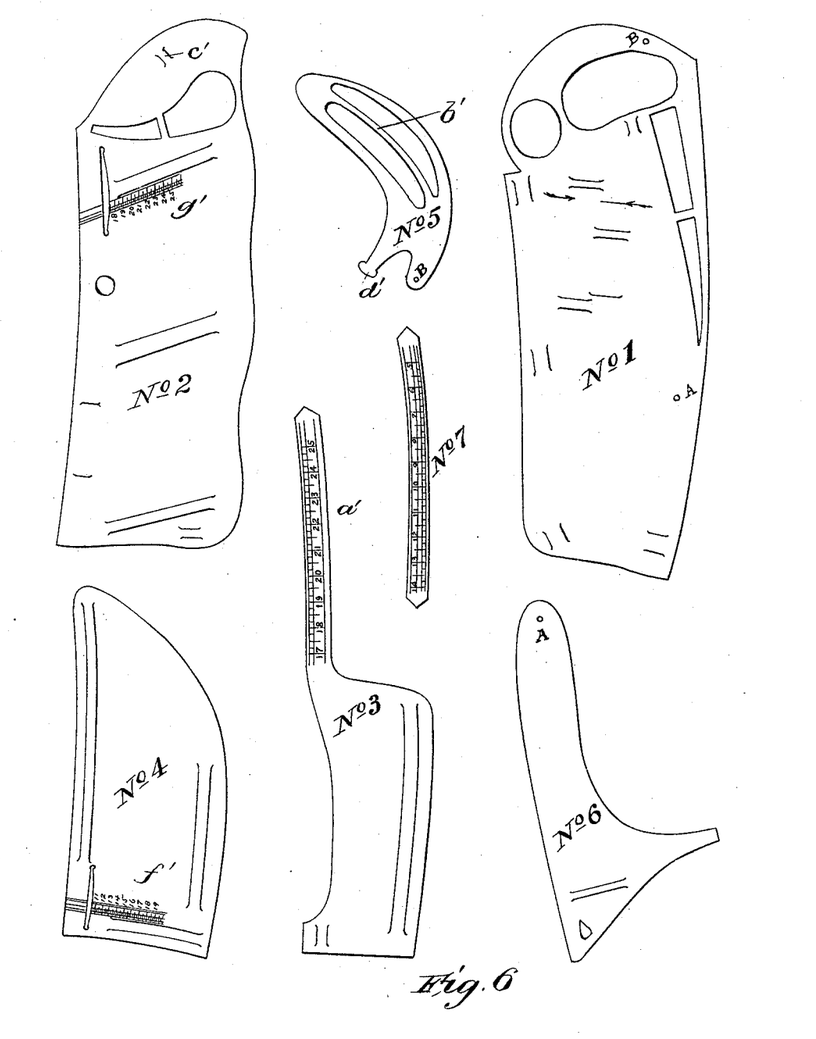

In Figs. 4, 5, and 6 I have shown the principle of simultaneous and uniform adjustment of the parts applied to a sleeve-pattern. In this instance 1 represents the body-piece, 2 the side, and 3 and 4 the extensible end pieces interlocked by guide strips and loops to permit their moving. The piece 3 has a long scale-extension *a'* on its upper end, which passes through openings in the body-piece 1. 5 represents the curved arm or lever pivoted to the upper end of the body-piece 1 and formed with a central guide-strip *b'*, working in a loop *c'* in the upper end of the side piece 2. This lever has a tongue *d'* on its lower edge, which engages with a pivoted piece 6 on the under side of the body-piece 1. This piece 6 is to adjust the measurement through openings in the body-piece 1. A sliding scale *e'* is secured in loops in the body-piece 1 to indicate with the scale *a'* and scales *f'* and *g'* on the pieces 2 and 4 the proper adjustment of the pieces in relation to the measure.

Figure 7:
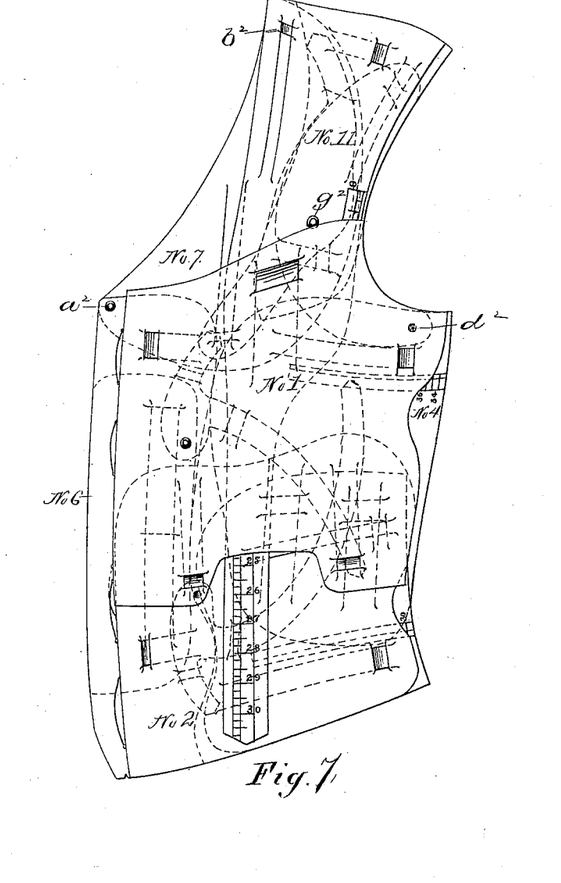
Figs. 7, 8, and 9 represent, respectively, the front pattern for vests contracted, expanded, and in detail.
Figure 8:
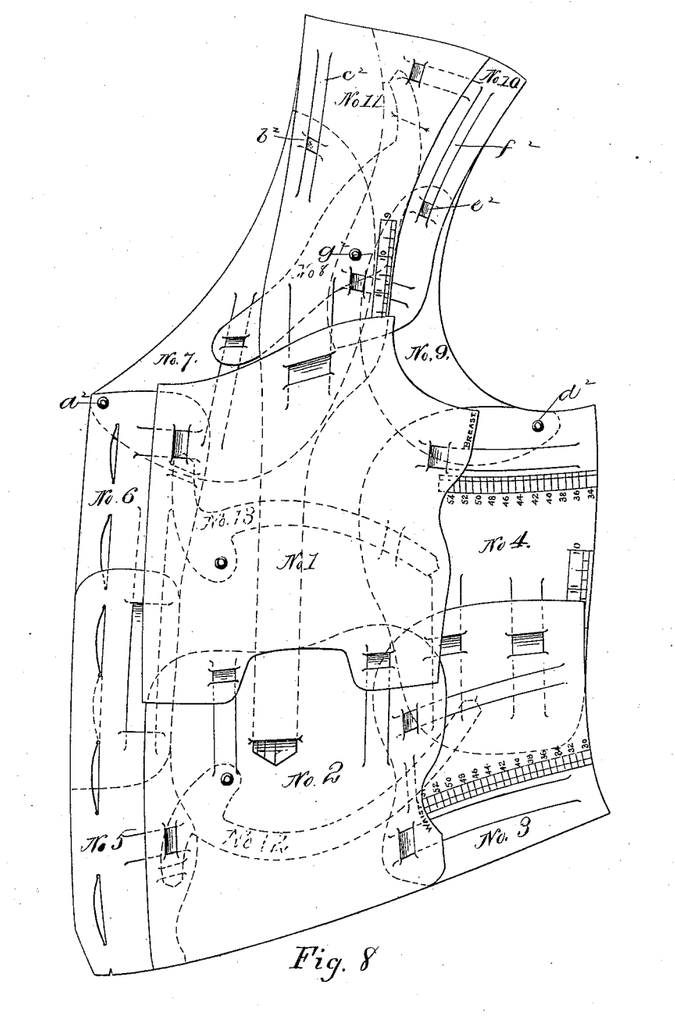
Figure 9:
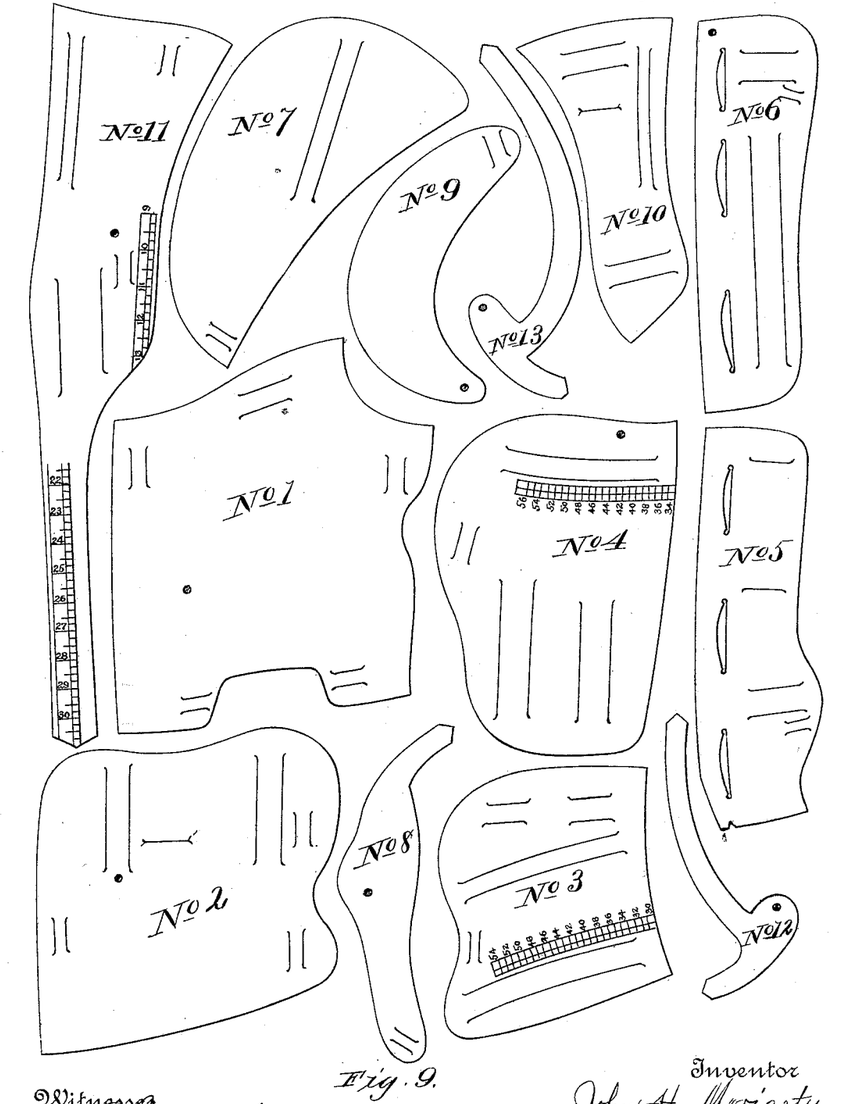

In Figs. 7, 8, and 9 I have shown the principle above described in connection with a vest-pattern, in which No. 1 is the body-piece, Nos. 2 and 3 the lower and No. 4 the upper body-piece of the back, Nos. 5 and 6 the front edge pieces, and Nos. 10 and 11 the shoulder edge pieces, all of which are interlocked slidingly and secured by suitable guide-strips and loops, as heretofore described. No. 7 is the curved chest-piece, pivoted at $a^2$ to the upper end of the front piece 6, and having a loop $b^2$ in its upper end, through which passes a guide-strip $c^2$ on the piece 11, so that movement of the piece 7 is always governed by the movement of the parts to which it is attached. No. 9 is the regulating-piece for the armpit. It is curved and pivoted at $d^2$ to the upper end of the piece 4, and is slidingly united to the piece 10 by a loop $e^2$, through which a guide-strip $f^2$ passes, the movement of the pieces 4 and 10 governing the movement of the same in proportion to the extent of their movement. To extend the front piece by the movement of the rear pieces, I employ two curved arms or levers 12 and 13, having lateral projections on their front ends, one of which is pivoted to the pieces 1 and 2, respectively, and the other projection passing through loops in the respective front edge pieces. The long curved arms of these levers are extended back through suitable loops in the edge pieces 3 and 4, so that the movement of the latter will force the projections in the loops on the fronts out or in, as the case may be, thus moving the fronts. No. 8 is a rocking arm or lever pivoted at $g^2$ to the piece 11 and having an elliptical form, its ends being slidingly secured in the pieces 7 and 10, so that when the piece 11 is moved the pieces 7 and 10 will be correspondingly moved. The pieces 3, 4, and 11 have scales thereon, arranged as shown, to adjust the patterns to the proper measure.

Figure 10:
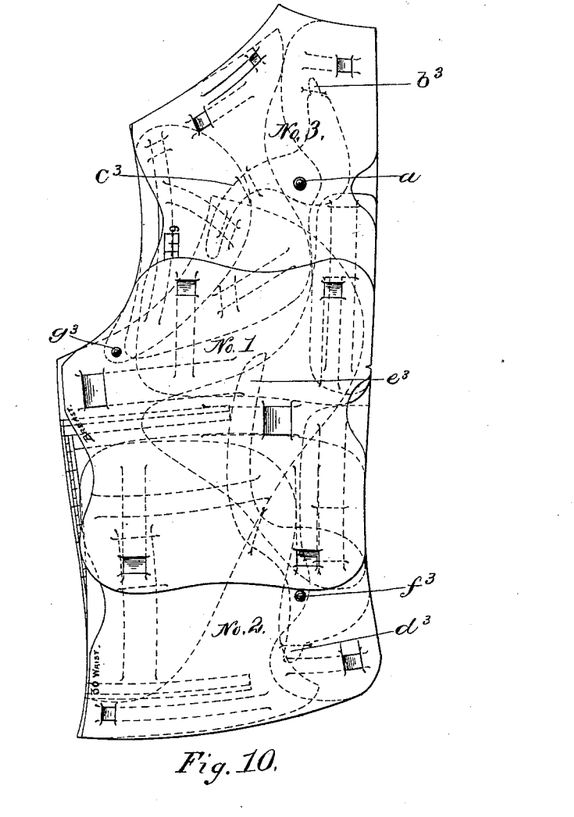
Figs. 10, 11, and 12 are similar views of the back patterns for vests.
Figure 11:
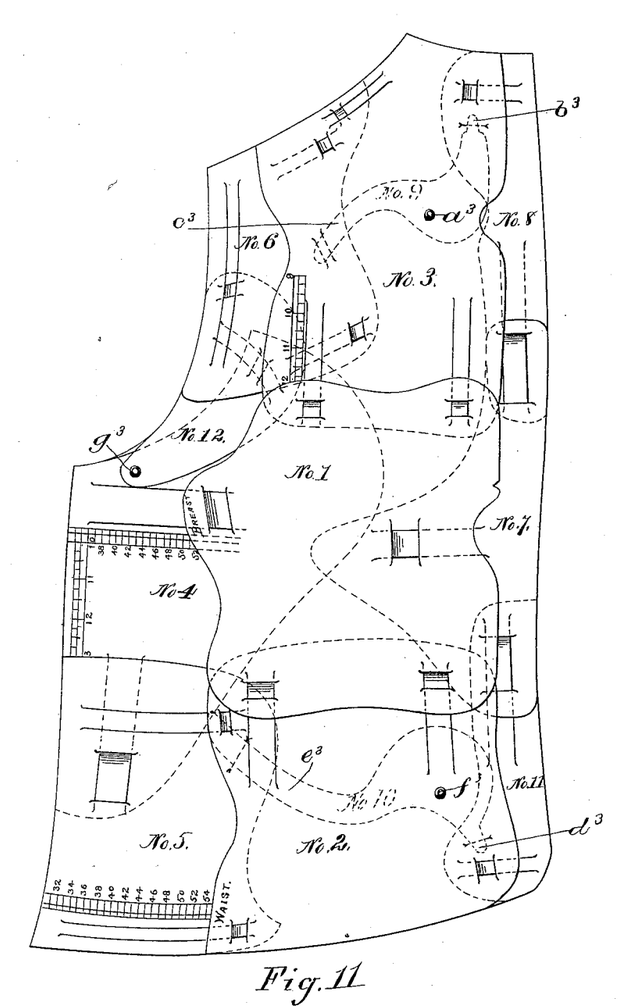
Figure 12:
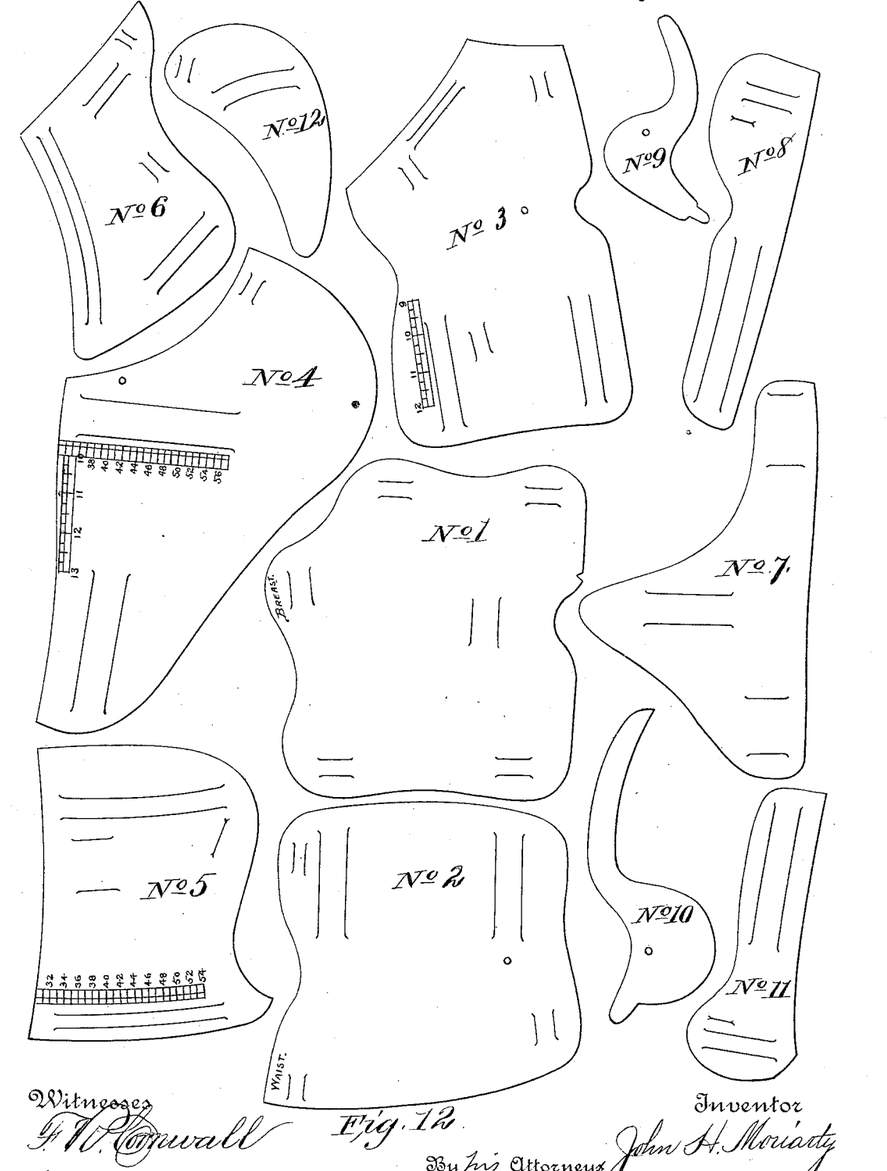

In Figs. 10, 11, and 12 I have shown a pattern for the back of a vest. In this form the main part or body-piece 1 is located centrally. The pieces 2 and 5 form the lower edge, and the pieces 4 and 5 the front edge pieces, the pieces 7 and 11 the rear edge pieces, and the pieces 3, 6, and 8 the upper edge pieces, interlocked and slidingly secured together by suitable guide-strips and loops, as in the constructions heretofore described. To secure the simultaneous proportionate movement of the pieces 7, 8, and 11, I employ two curved arms or levers 9 and 10. The former is pivoted near its center to the piece 3 at $a^3$ and has an upwardly-extending tongue $b^3$ and a curved arm $c^3$ on its opposite ends. This tongue and arm are inserted in suitable loops on the pieces 6 and 8. The lever 10 has a tongue $d^3$ on its lower end and a long curved arm $e^3$ at its other end. It is pivoted to the piece 2 by a rivet $f^3$. The ends of the lever pass through loops in the pieces 5 and 11, respectively. As the pieces 5 and 6 are moved out, the curved arms of the levers are moved, thereby forcing out the pieces 8 and 11, and as piece 7 is secured to these pieces 8 and 11 it is accordingly moved out in proportion to the pieces 5 and 6. The piece 12, forming the rear edge piece of the arm-hole, is pivoted at $g^3$ to the piece 4 and has its upper end slidingly secured to the piece 6, so that the adjustment of the pieces 4 and 6 will proportionately adjust the piece 12. In the piece 4 are placed scales at right angles to each other, and a horizontal scale is placed on the lower edge of piece 5.

Figures 13, 14:
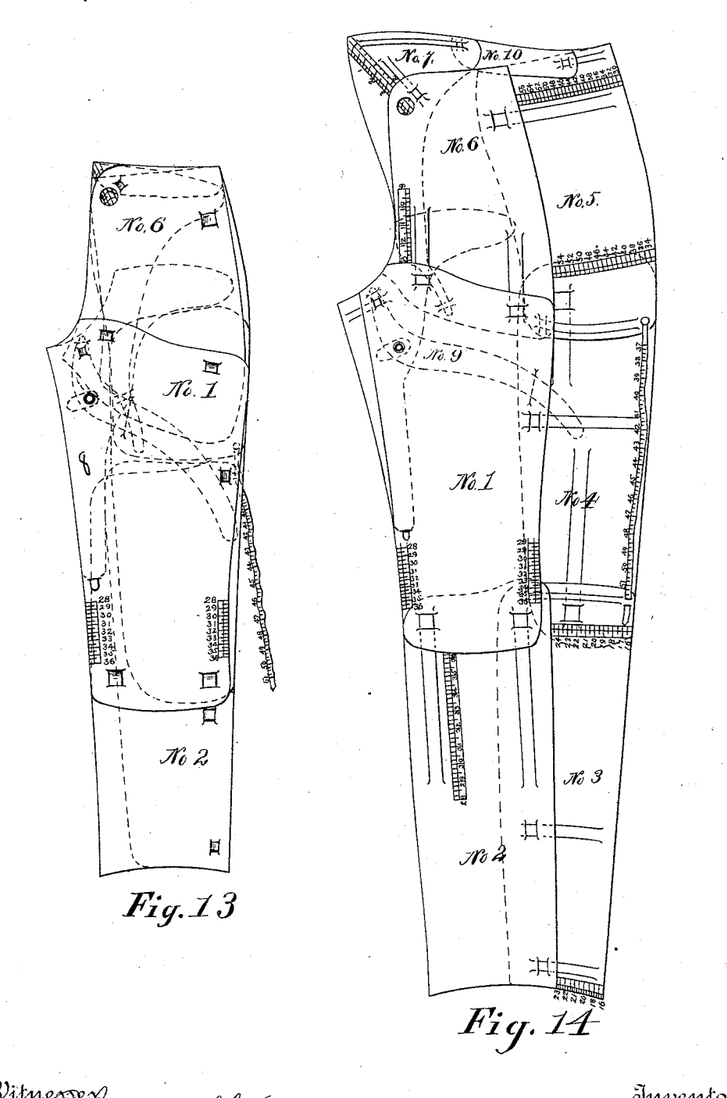
Figs. 13, 14, and 15 represent, respectively, the front pattern for trousers contracted, expanded, and in detail.
Figure 15:
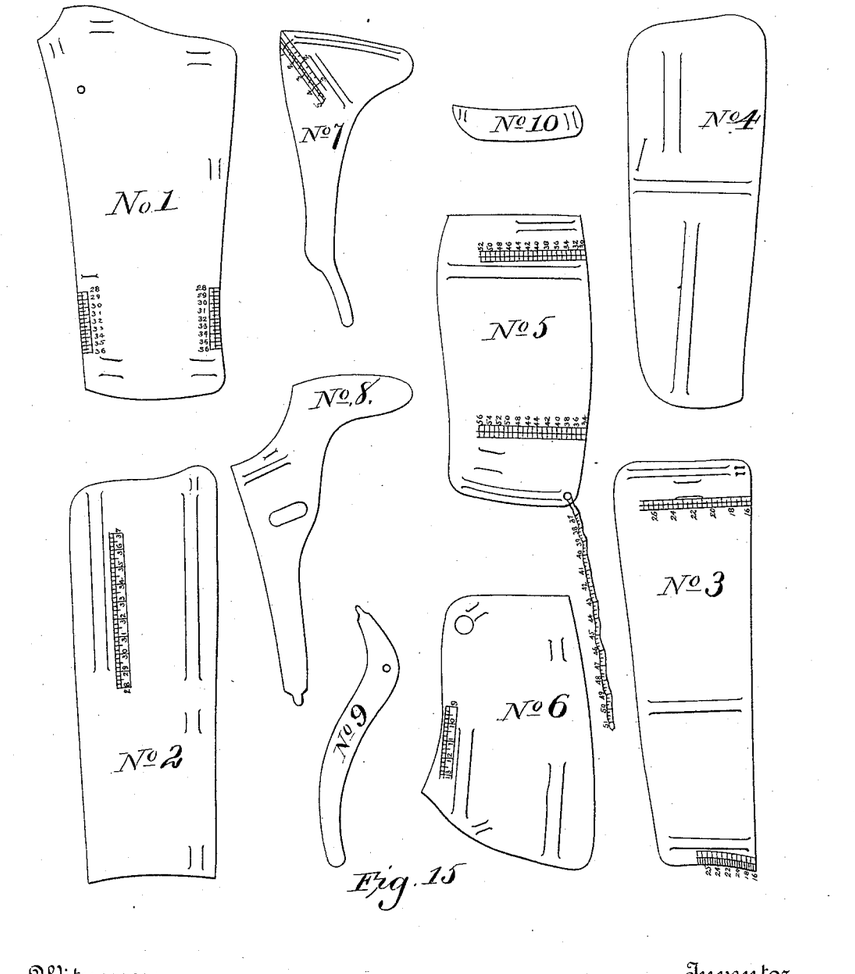

In Figs. 13, 14, and 15 I have shown the principle, as above set forth as applied to patterns for the front of trousers, wherein Nos. 1 and 3 represent front edge pieces, Nos. 2 and 3 the lower edge pieces, Nos. 3, 4, and 5 the rear edge pieces, and Nos. 5, 6, 7, and 10 the upper edge pieces, interlocked by suitable guide-strips and loops, so as to be moved to fit the measure. 8 represents the crotch-extension, having a tongue on its lower end, which fits in the outer edge of piece 1. This piece 8 is formed with a curved upper end and has a guide-strip thereon, which passes through a loop in the piece 1. No. 9 represents the curved lever or arm pivoted to the piece 1 and extending upward into engagement with the piece 8. Its opposite end or arm is curved downward and passes through a loop in the rear piece 4, so that an outward movement of the piece 4 will cause a like movement of the piece 8, keeping the adjustment of these parts in proportion. On the pieces 1, 3, 5, 6, and 7, I place suitable scales, as shown.

Figures 16, 17:
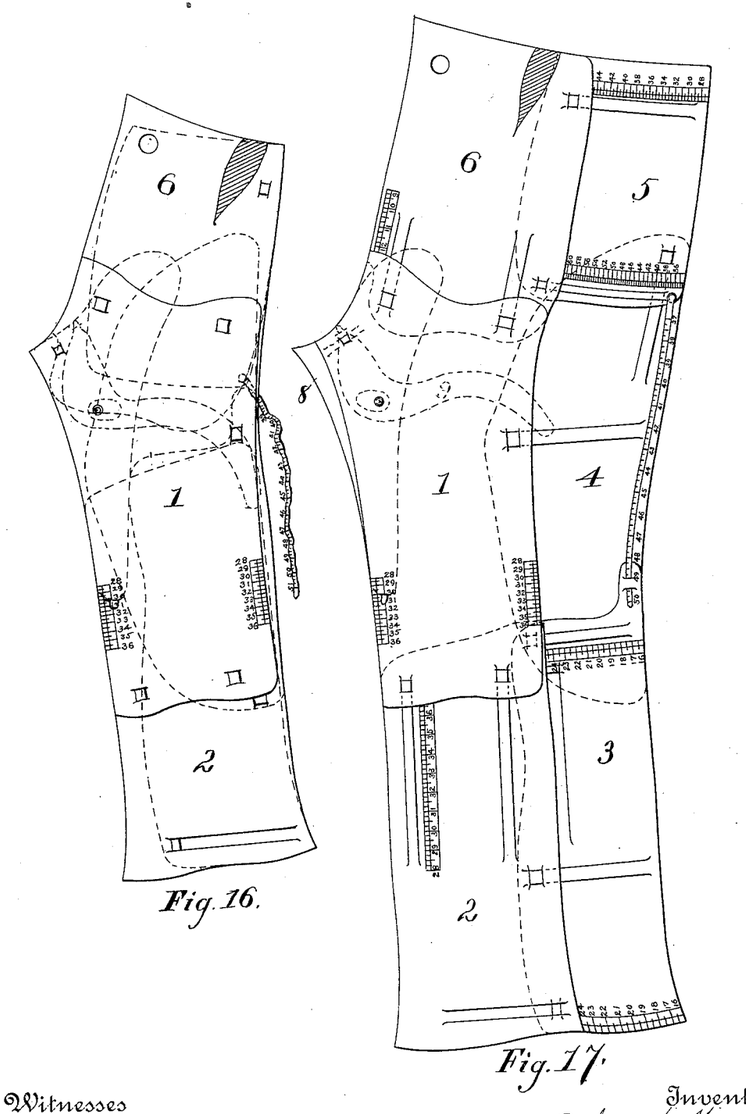
Figs. 16, 17, and 18 are similar views of the back pattern for trousers.
Figure 18:
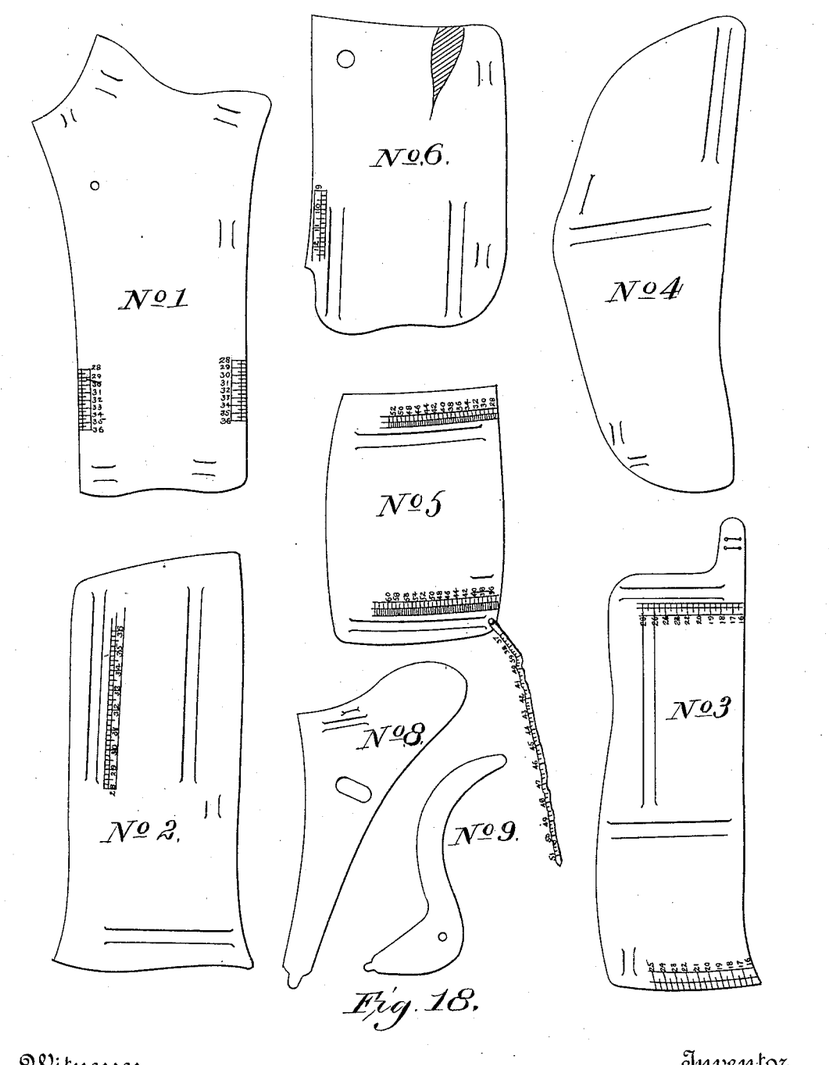

In Figs. 16, 17, and 18 I have shown a pattern for the rear of trousers, the parts being arranged and adjusted in a manner similar to the construction in Figs. 13, 14, and 15, the shape only being altered to suit this measure.

It will thus be seen that by the interlocking arrangement of the pieces by the guide-strips and loops the pieces may be readily adjusted according to the measure, and by the use of the curved arms a uniformly or proportionate and simultaneous adjustment of certain important parts can be obtained with exactness.

I am aware that many minor changes may be made in the construction and arrangement of the parts of my invention and substituted for those herein shown and described without in the least departing from the nature and principle of my invention.

Having thus described my invention, what I claim as new, and desire to secure by Letters Patent, is—

1. In a pattern for apparel, the combination, with the body-piece, of a series of edge pieces movably secured thereto and a curved arm pivoted to the body-piece, having its ends extended out in opposite directions and engaging directly with the edge pieces on opposite sides of the body-piece, respectively, whereby the movement of the pieces on one side moves the pieces on the other side, substantially as described.

2. In a pattern for apparel, the combination, with a body-piece and a series of movable edge pieces connected thereto, of a curved arm pivoted to the body-piece, its outer end being curved upwardly, a projection on the arm below the pivot, and loops in the movable pieces in which said projection and curved end are placed, substantially as described.

In testimony whereof I affix my signature in presence of two witnesses.

JOHN H. MORIARTY.

Witnesses:
   LOUIS E. REED,
   L. S. BACON.